US006298351B1

(12) United States Patent
Castelli et al.

(10) Patent No.: US 6,298,351 B1
(45) Date of Patent: Oct. 2, 2001

(54) MODIFYING AN UNRELIABLE TRAINING SET FOR SUPERVISED CLASSIFICATION

(75) Inventors: Vittorio Castelli, White Plains, NY (US); Sharmila Thadhani Hutchins, Boulder, CO (US); Chung-Sheng Li, Ossining; John Joseph Edward Turek, South Nyack, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/840,214

(22) Filed: Apr. 11, 1997

(51) Int. Cl.[7] .................................................. G06F 17/30
(52) U.S. Cl. ..................... 707/102; 707/553; 370/465; 706/25; 382/203
(58) Field of Search ................... 707/1, 3, 5, 6, 707/100, 101, 102, 104, 533, 553; 382/158, 203, 228, 159; 706/25, 13, 59; 370/465

(56) References Cited

U.S. PATENT DOCUMENTS

| | | | | |
|---|---|---|---|---|
| 4,719,571 | * | 1/1988 | Rissanen et al. | 707/101 |
| 5,136,686 | * | 8/1992 | Koza | 706/13 |
| 5,335,291 | * | 8/1994 | Kramer et al. | 382/158 |
| 5,481,649 | * | 1/1996 | Birdwell et al. | 706/59 |
| 5,555,317 | * | 9/1996 | Anderson | 382/159 |
| 5,559,929 | * | 9/1996 | Wasserman | 706/25 |
| 5,634,087 | * | 5/1997 | Mammone et al. | 706/25 |
| 5,684,929 | * | 11/1997 | Cortes et al. | 706/25 |
| 5,687,364 | * | 11/1997 | Saund et al. | 707/6 |
| 5,727,081 | * | 3/1998 | Burges et al. | 382/229 |
| 5,727,199 | * | 3/1998 | Chen et al. | 707/6 |
| 5,734,893 | * | 3/1998 | Li et al. | 707/104 |
| 5,768,422 | * | 6/1998 | Yaeger | 382/228 |
| 5,799,301 | * | 8/1998 | Castelli et al. | 707/6 |
| 5,870,399 | * | 2/1999 | Smith | 370/465 |
| 5,956,739 | * | 9/1999 | Golding et al. | 707/533 |
| 6,067,535 | * | 5/2000 | Hobson et al. | 706/10 |
| 6,111,983 | * | 8/2000 | Fenster et al. | 382/203 |

OTHER PUBLICATIONS

Castelli et al., "The Relative Value of Labeled and Unlabled Samples in Pattern Recognition with an Unknown Mixing Parameter," International Symposium on Information Theory, Norway, p. 2103–2117, Dec. 1999.*

Castelli et al., "The Relative Value of Labeled and Unlabled Samples in Pattern Recognition," International Symposium on Information Theory, IEEE, p. 355–355, 1993.*

Castelli et al., "Classification Rules in the Unknown Mixture Parameter Case; Relative Value of Labeled and Unlabled Samples," International Symposium on Information Theory, IEEE, p. 111, 1994.*

Castelli et al., "Classification Rules in the Unknown Mixture Parameter Case Relative Value of Labeled and Unlabeled Samples," Information Theory, Jun. 1994, Proceedings of IEEE, p. 111.*

Pinciroli et al., "A Technological Environment and a Software Product for Teaching Dynamic Electrocardiography," Computers in Cardiography, 1988, Proceedings, pp. 473–476.*

Li et al., "HierarchyScan: A Heirarchical Similarity Search Algorithm Databases of Long Sequences," Data Engineering, Proceedings, p. 546–553, Feb. 1996.*

(List continued on next page.)

Primary Examiner—Thomas Black
Assistant Examiner—Charles L. Rones
(74) Attorney, Agent, or Firm—Wayne L. Ellenbogen, Esq.; Kevin P. Radigan, Esq.; Heslin & Rothenberg, P.C.

(57) ABSTRACT

An unreliable training set is modified to provide for a reliable training set to be used in supervised classification. The training set is modified by determining which data of the set are incorrect and reconstructing those incorrect data. The reconstruction includes modifying the labels associated with the data to provide for correct labels. The modification can be performed iteratively.

25 Claims, 6 Drawing Sheets

OTHER PUBLICATIONS

Castelli et al., "Progressive Classification in the Compressed Domain for EOS Satellite Databases," Acoustics, Speech, and Signal Processing, IEEE, pp. 2199–2202, vol. 2, May 1996.*

Duda et al., Pattern Classification and Scene Analysis, "Bayes Decision Theory" (Chapter 2), pp. 10–13, Wiley & Sons (1973).

Duda et al., Pattern Classification and Scene Analysis, "Parameter Estimation And Supervised Learning", (Chapter 3), pp. 44–45, 76–79, Wiley & Sons (1973).

Duda et al., Pattern Classification and Scene Analysis, "Unsupervised Learning And Clustering", (Chapter 6), p. 189–191, Wiley & Sons (1973).

"Progressive Classification In The Compressed Domain For Large EOS Satellite Databases", by Vittorio Castelli, Chung–Sheng Li, John Turek, Ioannis Knotoyiannis, IEEE 1996, p. 104.

* cited by examiner

ORIGINAL LABELS
|  | | L1 | L2 |
|---|---|---|---|
| CLUSTER LABELS | A | 1 | 20 |
| | B | 15 | 5 |
| | C | 8 | 8 |
| | D | 1 | 12 |
*fig. 5*
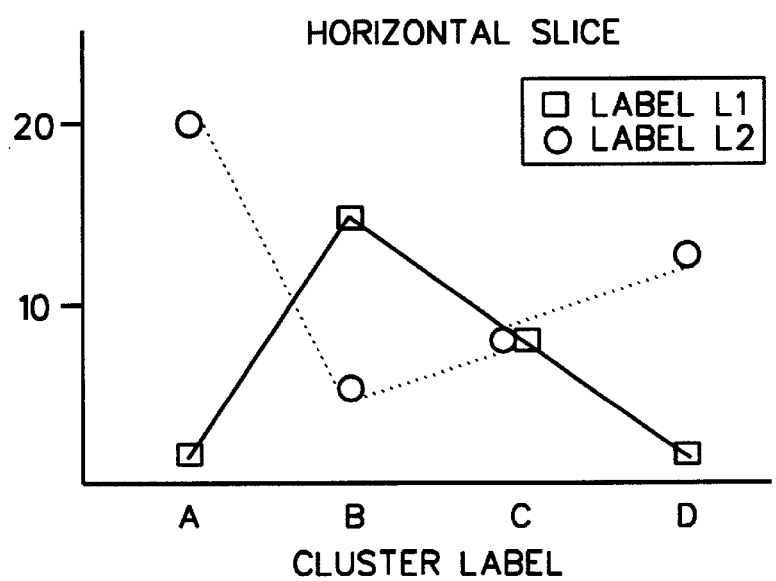
*fig. 6*
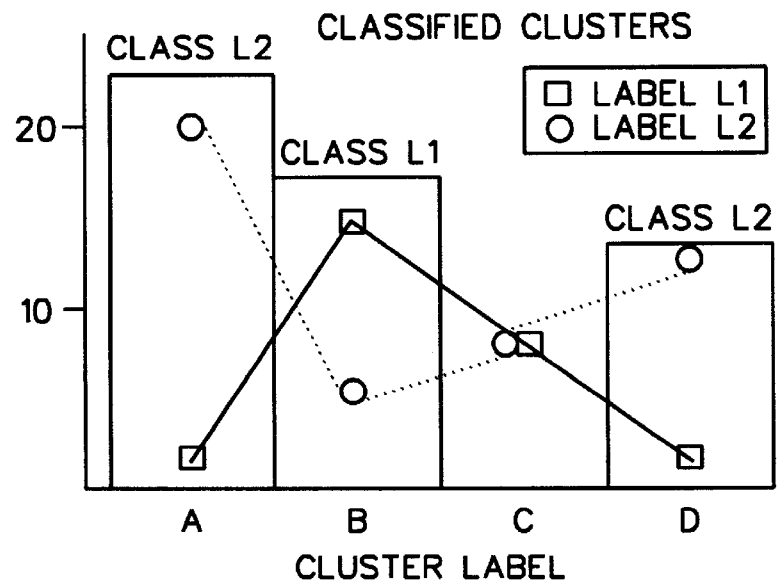
*fig. 7*

MODIFYING AN UNRELIABLE TRAINING SET FOR SUPERVISED CLASSIFICATION

TECHNICAL FIELD

This invention relates, in general, to classification techniques, and, in particular, to modifying unreliable training sets for use in supervised classification.

BACKGROUND ART

Classification is one of the most important operators that is used for phenomenal (or similarity) searches in various image, video, and data mining applications. In a phenomenal search, a target pattern is usually classified according to a set of predefined classes. The target pattern can include, for instance, the spectral signature of a pixel from an image or video frame; the spatial signature of a block of an image or video frame defined by its texture features; the frequency signature of a time series such as stock index movement; or the spatial signature of 3D seismic data.

In order to achieve high classification accuracy, it is usually necessary to train a classifier with sufficient training data from each individual class. However, gathering reliable training data is usually difficult, if even feasible. As an example, the current United States land cover/land use maps were developed around the late 1960's by the United States Geology Survey (USGS). These maps are not completely accurate due to errors in the photointerpretation of the images used to create them, their limited resolution and inaccuracies in geolocation. Additional errors arise when using these maps as source of ground truth in conjunction to more recent images to train the classifier, due to various natural and artificial land cover transformation. As a result, the accuracy of the classifier suffers.

Similarly, classifying video, time series, and 3D seismic data could also encounter unreliable training data.

One way of generating more reliable training data typically involves clustering the data using one of the unsupervised classifiers or vector quantization methods. A human expert then labels the clusters manually. This methodology is appropriate, however, only for generating a small set of training data, since it requires human intervention. Furthermore, it does not automatically incorporate preexisting classified data even though those preclassified data may not be completely accurate.

Other techniques for generating training data include the discarding of outliers. These approaches invariably address those samples that appear to be a statistical anomaly. However, these approaches cannot deal with the situations when the training set is either mislabeled or changed.

Based on the foregoing, a need exists for a training set that is reliable and fully useable. Additionally, a need exists for a technique that allows the modification of an unreliable training set.

SUMMARY OF THE INVENTION

The shortcomings of the prior art are overcome and additional advantages are provided through the provision of a method for modifying a training set for use in data classification. The method includes, for example, determining at least one datum of the training set is incorrect and reconstructing the at least one datum to provide a modified training set.

In one embodiment of the invention, the reconstructing includes modifying a label associated with the at least one datum to provide a correct label.

In a further embodiment of the invention, the training set includes a plurality of data, each with a corresponding label, and the determining includes dividing the plurality of data into a plurality of groups, and applying one or more rules to at least a portion of the data of at least one group to determine if any of the corresponding labels of the at least one portion of the data is incorrect.

In a further embodiment of the invention, the reconstructing includes constructing a contingency table for the data of the plurality of the groups, creating a histogram from the contingency table, identifying any regions of low confidence from the histogram, and modifying labels associated with data identified to be within a region of low confidence.

In a further aspect of the invention, a system of modifying a training set for use in data classification is provided. The system includes a means for determining at least one datum of the training set is incorrect and a reconstruction unit adapted to reconstruct the at least one datum of the training set to provide a modified training set.

In yet another aspect of the invention, an article of manufacture is provided. The article of manufacture includes a computer useable medium having computer readable program code means embodied therein for causing the modification of a training set for use in data classification. The computer readable program code means in the article of manufacture includes computer readable program code means for causing a computer to effect determining at least one datum of the training set is incorrect, and computer readable program code means for causing a computer to effect reconstructing the at least one datum of the training set to provide a modified training set.

The capability of the present invention provides for reliable training sets. Additionally, it improves the performance of classification techniques, such as supervised classification techniques, which utilize the training set for deriving classification rules.

Additional features and advantages of the invention are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 5 is one example of a contingency table built during the modification technique of FIG. 4, in accordance with the principles of the present invention;

FIG. 6 is an example of a set of histograms obtained from horizontal slices constructed from the contingency table of FIG. 5, in accordance with the principles of the present invention;

FIG. 7 is an example of a relabelling of the clusters depicted in FIG. 6, in accordance with the principles of the present invention;

BEST MODE FOR CARRYING OUT THE INVENTION

Figure 1:
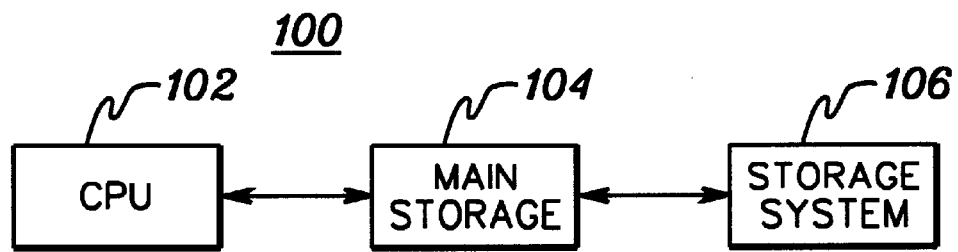
FIG. 1 depicts one example of a computing environment incorporating and using the training set modification capability of the present invention.

In accordance with the principles of the present invention, a technique is provided for modifying an unreliable training set for use in classification and, in particular, in supervised classification. In one embodiment, the modification capability of the present invention is incorporated and used in a computing environment, such as the one depicted in FIG. 1. Computing environment 100 includes, for instance, one or more central processing units 102, a main storage 104 and a storage system 106, each of which is described below.

As is known, central processing unit (CPU) 102 is the controlling center of computing system 100 and provides for the sequencing and processing facilities for instruction execution, interruption action, timing functions, initial program loading and other machine related functions. The central processing unit executes at least one operating system, which as known, is used to control the operation of the computer by Controlling the execution of other programs, controlling communication with peripheral devices and controlling use of the computer resources. The modification facility of the present invention is, in one embodiment, controlled by the operating system, similar to that of other computer programs.

Central processing unit 102 is coupled to main storage 104, which is directly addressable and provides for high speed processing of data by the central processing unit. Main storage may be either physically integrated with the CPU or constructed in stand alone units.

Main storage 104 is also coupled to storage system 106, which includes one or more of a variety of input/output devices, such as, for instance, keyboards, communications controllers, teleprocessing devices, printers, magnetic storage media (e.g., tape, disks), direct access storage devices, and sensor based equipment. Data is transferred from main storage 104 to storage system 106, and from the storage system back to main storage.

One example of computing system 100 incorporating and using the modification capability of the present invention is an RS/6000 computer system offered by International Business Machines Corporation. This is only one example, however. The present invention can be used within other computing environments or with other computer systems without departing from the spirit of the present invention.

Figure 2:
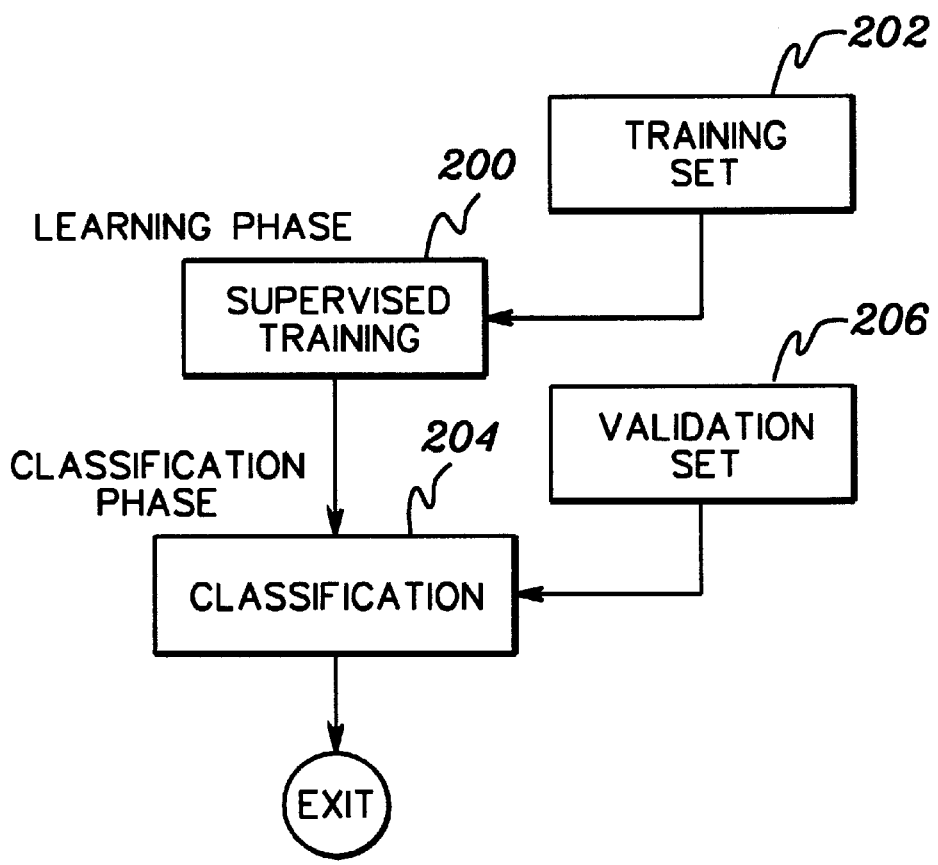
FIG. 2 depicts one example of the logic associated with a general supervised classification technique, which utilizes both a training set and a validation set.

A typical supervised classification process of a data set is shown in FIG. 2. In one embodiment, the classification process is to assign a class C to each entry in a data set, D. The class C, belongs to a set of classes referred to as {0, 1, . . . , C}. In the case of an image, such a data set D consists of the image itself plus a class label for each pixel. In other words, I(i,j) represents the class at location (i,j). For example, classes such as forest, urban land, wetland, etc. can be assigned to each pixel in an aerial photo or a satellite image. One example of supervised classification is described in *Pattern Classification and Scene Analysis*, by Richard O. Duda and Peter E. Hart, John Wiley & Sons, 1973, which is hereby incorporated herein by reference in its entirety.

A supervised classification process can usually be divided into two phases. The first phase 200 is a learning phase, which receives as input a training set 202 and constructs a set of rules that associates input patterns with output labels or classes. In one embodiment, a set of rules refers to rules, parameters or a combination of both. The rules may be actual language rules and/or mathematical rules.

The existence of a training and validation data set, T, that is required for training a classifier is assumed. (In another embodiment, the training and validation data sets are separate data sets. The validation data set can be, for instance, a portion of the training data set. Further, the validation data set is optional.) Each entry in the data set T is usually an n-dimensional vector, (t1, t2, . . . , tn), called a feature vector. In images, features usually are the values of the pixel in the different color bands, or computed from a subset of the pixels from the image. In one example, for regular color images or video, n=3, and for multispectral satellite images, n could vary anywhere from 1 (for SAR images) to 7 (for TM images) and 256 on some of the future earth observing satellites.

The vectors in the training set are used together with their labels as input to an appropriate learning algorithm 200 in order to train a classifier. The output of the learning phase, which is the set of association rules, is then input to a second phase 204. The second phase is a classification phase, which applies the association rules learned from the training set to new input patterns. In many cases, a validation set 206, which also has a set of association rules, is used to evaluate the performance of a specific classifier.

Typically, the class label from the classified data set is not completely reliable due to the following reasons:

Resolution Incompatibility: This usually occurs when the classified data set is resampled to a higher resolution.

Temporal Incompatibility: This usually occurs when there is a time difference between the training set and the target data set that is going to be classified.

Thus, an unreliable training set is provided. Since an erroneous training set not only confuses the classifier, but also induces potential errors when determining the boundaries between different classes, the present invention provides a technique for providing a reliable training set.

Figure 3:
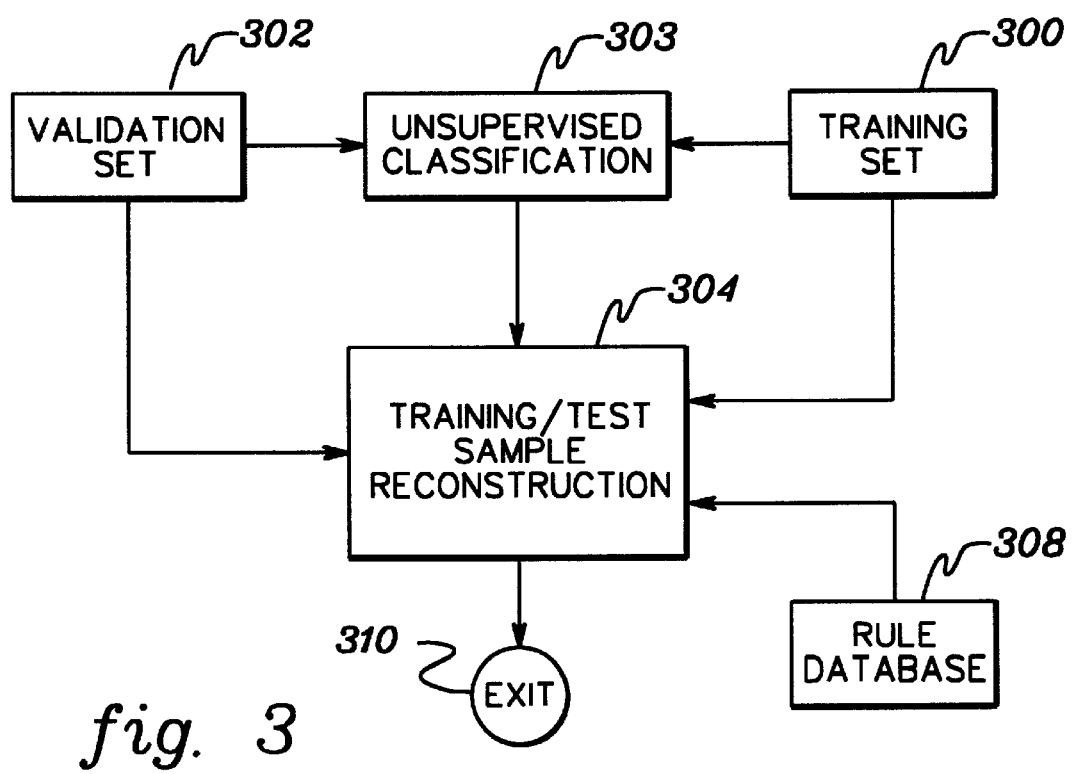
FIG. 3 depicts one example of the logic associated with a technique for providing a training set by using results from unsupervised classification, in accordance with the principles of the present invention.

In accordance with the principles of the present invention, a reliable training set is provided by refining the given unreliable training set. One embodiment of such a refinement technique is described in detail with reference to FIG. 3. A given training set 300 and a given validation set 302, which are already associated with initial class assignments, are first input to an unsupervised classification technique 303. One example of an unsupervised classification technique is described in detail in *Pattern Classification and Scene Analysis*, by Richard O. Duda and Peter E. Hart, John Wiley & Sons, 1973, which is hereby incorporated herein by reference in its entirety.

During unsupervised classification, the training set (and/or the validation set) is clustered by any one of various clustering schemes, such as k-means, self-organization map, or vector quantization. That is, the data of the training set is first divided into groups of similar data, irrespective of labels. These techniques usually compute the statistical behavior of the data set, such as the centroid and the variance of each cluster, and then assign a new cluster label to each datum point in the data set corresponding to the group it fell into. The number of cluster labels is usually much larger than the number of clusters (or classes). Thus, the output of the unsupervised classification technique is a set of clusters, each having a cluster label.

In accordance with the principles of the present invention, the output of the unsupervised classification, including the clusters and cluster labels, is input to a training/test sample reconstruction unit 304, along with the original labels in the training set. The reconstruction process applies rules, which may be stored in an optional rule database 308, to the input data to determine what to do with the original training set data. In particular, the reconstruction technique uses rules to determine whether the original labels associated with the training set data need to be modified.

A set of samples rules include the following:

Cluster labels that belong to only one class are assigned to that class;

Cluster labels are assigned to the dominant class, if a dominant class exists. The dominant class for a cluster label can be determined from a histogram and a contingency table, described below; and The pixel is assigned to a new class mixed, if no dominant class exists.

In one example, the dominant class can be determined experimentally. A dominant class is defined as:

$$P1/P2 > \alpha$$

where $\alpha$ is the predetermined threshold and the proportions of the first two largest classes are P1 and P2, respectively.

As an example, we assume $\alpha=2$. If the proportion of classes of a label is 70% for class 1, 20% for class 2, and 10% for class 3, then the dominant class is class 1. In contrast, if the label has 28% for class 1, 25% for class 2, 25% for class 3, and 22% for class 4, then there does not exist a dominant class.

Additional rules can also be defined for class assignments. For example, the following rules can be defined in the database: (1) the class "forest" can evolve into "rangeland" or "agriculture land", and (2) "rangeland" or "agriculture land" can evolve into "urban area". However, (3) the evolution from "forest" to "ice" is forbidden. In other words, we can define the notion of class migration in which a source class is migrated to the destination (or target) class. When the class evolution occurs, some of the clusters which evolve to the new classes are still associated with the old class id. These data entries in the training/validation data set can be identified by locating those clusters which are spread into several classes in a horizonal histogram (as these classes which are classified correctly originally have undergone class migration into the new class). The whole cluster can then be relabeled by the "sink" class, in which the destination class that is permitted by the rule for class migration will be selected for labeling the whole cluster. If the class migration is not permitted from class A to class B, then the cluster whose histogram spreads between class A and class B will be labeled by the dominant class, as described earlier.

When the reconstruction technique determines that an original label of a datum in the training set needs to be modified, it is revised, in accordance with the principles of the present invention. One embodiment of a technique for revising a training set is described in detail with reference to FIG. 4. Initially, a contingency table listing the concurrence between the clusters labels generated by the clustering technique and the original class assignments from the training data set is constructed, STEP 400. One example of a contingency table is depicted in FIG. 5. In one example, the (i,j)th entry represents the number of data entries in the training data set (and/or validation data set) belonging to the jth class in the unreliable training set, that have been clustered to the ith cluster label by the clustering technique. For instance, if i=1 and j=2, it is seen that 20 entries of the original class L2 have been clustered in cluster A.

Figure 4:
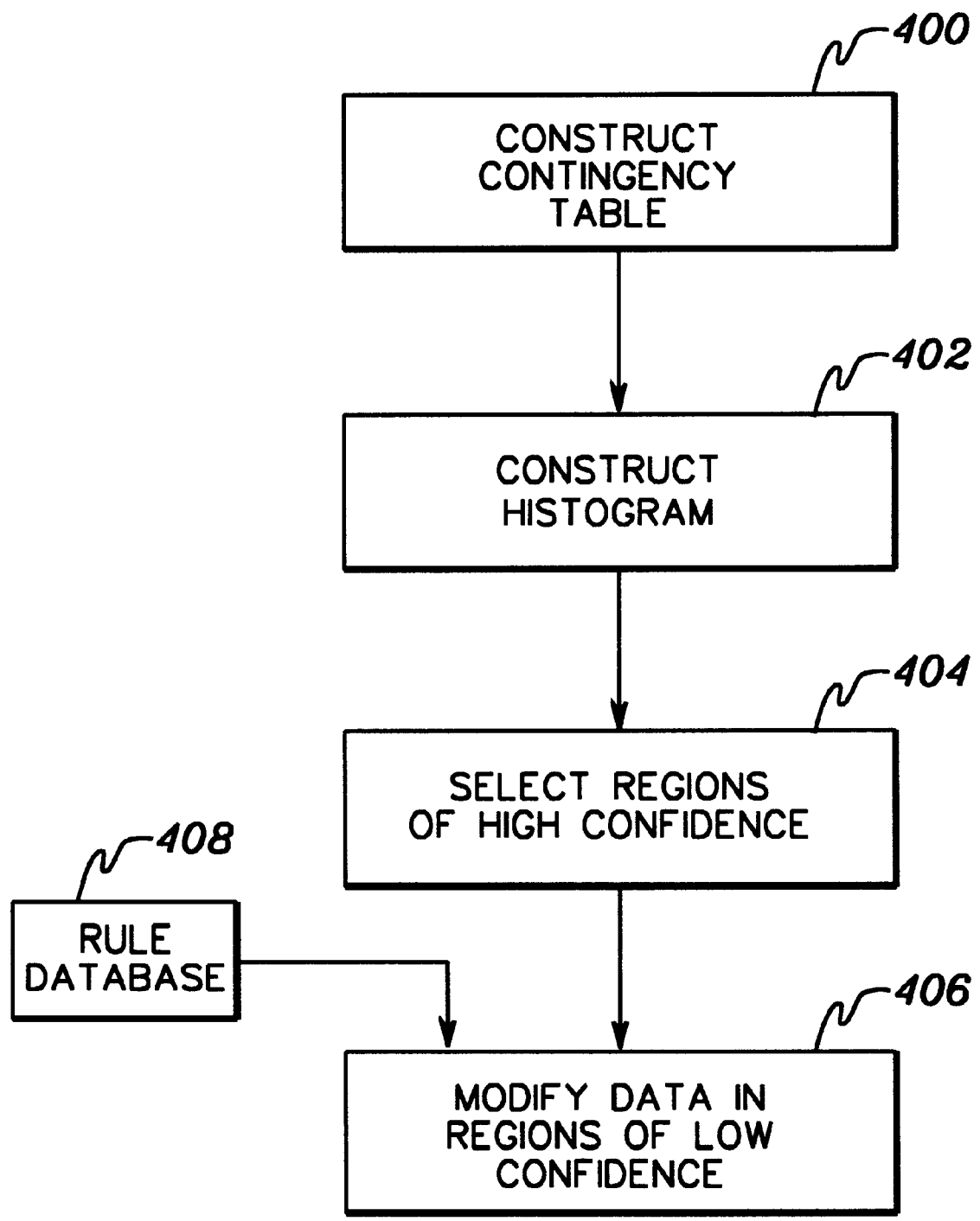
FIG. 4 depicts one example of the logic associated with reconstructing the training set of FIG. 3, in accordance with the principles of the present invention.

Subsequently, a histogram is constructed from the contingency table, STEP 402 (FIG. 4). Two types of histograms can be generated from the contingency table, a vertical histogram and/or a horizontal histogram. In one example, a horizontal histogram is created, as is shown in FIG. 6. This histogram merely depicts a graphical representation of the contingency table. In this figure, histograms of different classes (e.g., class L1 and L2) may overlap. Overlapped histograms can occur as a result of overlap in the support sets of the distributions of different classes; errors in the classified data set; and/or discrepancy between the classified data set and the training data set.

In FIG. 7, several of the clusters are classified depending on the number of data entries pertaining to a particular original class. For instance, cluster label A is classified as Class L2, since there are 20 entries labelled L2 and only one labelled L1. Likewise, cluster B is classified as L1. Cluster C is not classified, since there are equal amounts from both classes.

Thereafter, the regions of high confidence are selected, STEP 404 (FIG. 4). This is accomplished by determining which regions appear to have a certain percentage of correct labels, e.g., 88% or greater. For example, referring to FIGS. 5–7, Clusters A and D are regions of high confidence, and Clusters B and C are regions of low confidence. The regions of high confidence do not need to be modified, in this embodiment. However, any region that is considered of low confidence is modified, in accordance with the principles of the present invention. In particular, the labels of the data located in the low confidence region are modified using, for example, the rules described above to correctly reflect the data. Once this is complete, reconstruction of the training set is complete.

Figure 8:
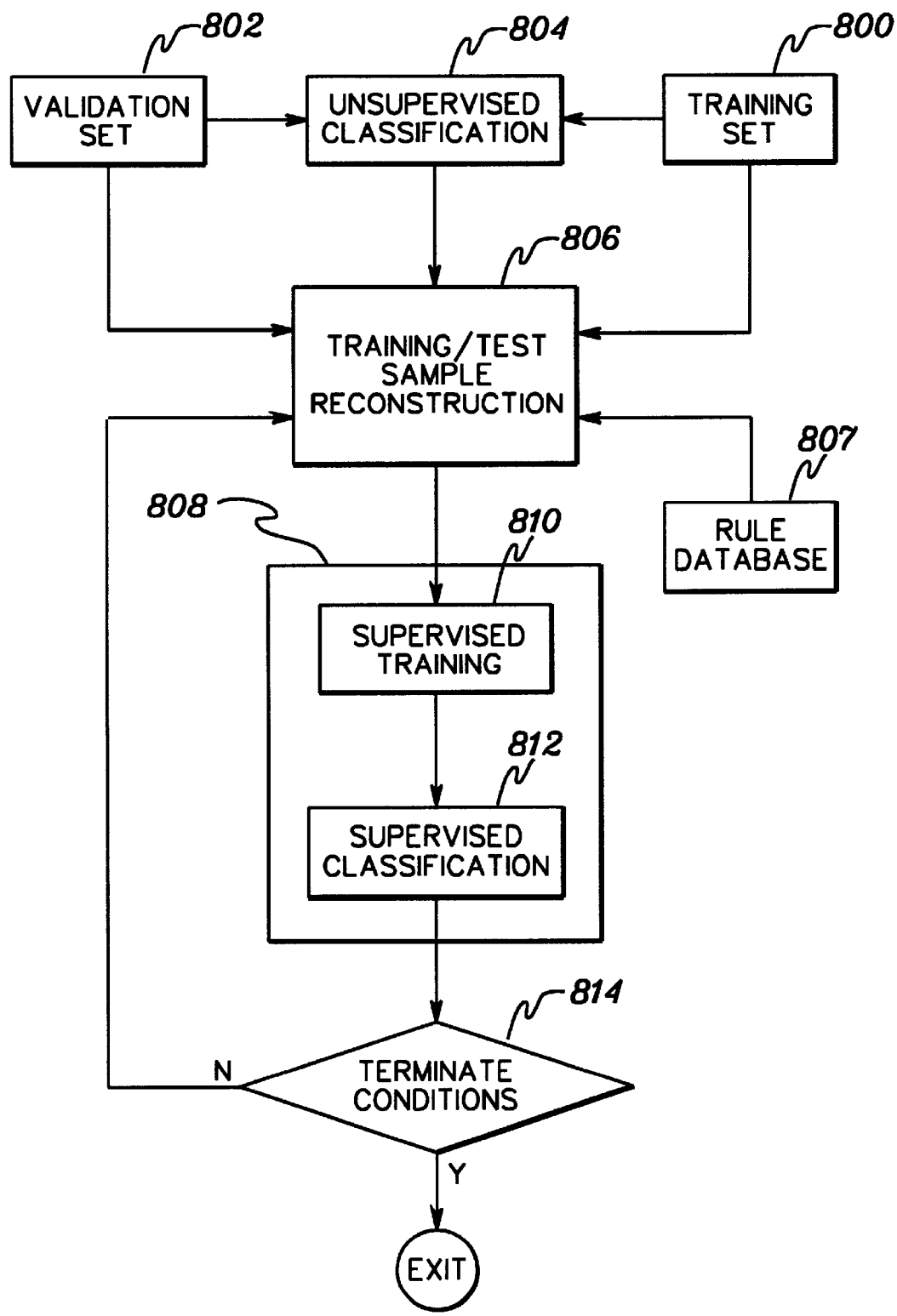
FIG. 8 depicts one example of the logic associated with iterative refinement of a training set, in accordance with the principles of the present invention.

In another embodiment of the present invention, the reconstruction of the training (and/or validation) data set is iterative, as described with reference to FIG. 8. As described with reference to FIG. 3, a training data set 800, and optionally, a validation data set 802, are input to an unsupervised classification technique 804, which performs clustering. The clusters and cluster labels output from the unsupervised classification are then input to a training/test sample reconstruction unit 806. The reconstruction technique applies rules, from an optional rule database 807, to determine whether the original labels associated with the training set data need to be modified. Once this determination is made, the modification takes place, as described above.

The output of the reconstruction, which is a modified training set, is then input to a supervised classification technique 808. In particular, a supervised training technique 810 receives as input the modified training set and constructs a set of rules (a trained classifier) using the example in the training set.

The output of the supervised training, the set of rules, is then input to a supervised classification technique 812, which instantiates the classifier. The results of the instantiation are compared against one or more predetermined conditions to determine if the modification is suitable, INQUIRY 814. For example, in one embodiment, a stopping condition is that the classification error does not reduce anymore when the training set is revised. This is apparently a greedy technique and the solution it generates could be a local optimal.

If the modification is not suitable, then processing continues with STEP 806. In particular, the classified output, C1 can substitute the original classified data set, C0, and go through the training/test data set selection process, again. In general, the classified output at the ith iteration, Ci will replace the classified output at the (i−1)th iteration. This process can continue until a satisfactory classification accuracy or an iteration limit is reached, resulting in an iterative refinement process.

Instead of the greedy technique described above, another technique, such as a genetic technique, can be used. The genetic technique allows multiple configurations to be tested simultaneously. In particular, in one example, many instances of the technique depicted in FIG. 8 are started. Then, unsupervised classification STEP 804 and one iteration of the loop are performed. The performances of all the instances of the technique, after one iteration, are considered according to measures and rules from the rule database (e.g., an index of better performance is the percentage of samples that fall into regions of high confidence). Subsequently, only the top p % instances of the technique (e.g., less than 50%), where p is a tunable parameter, is retained. For each of the p % instances, generate a certain number of siblings, by randomly partitioning the data into training and test sets. Repeat until convergence of the technique. At convergence, retain only the best technique.

Figure 9:
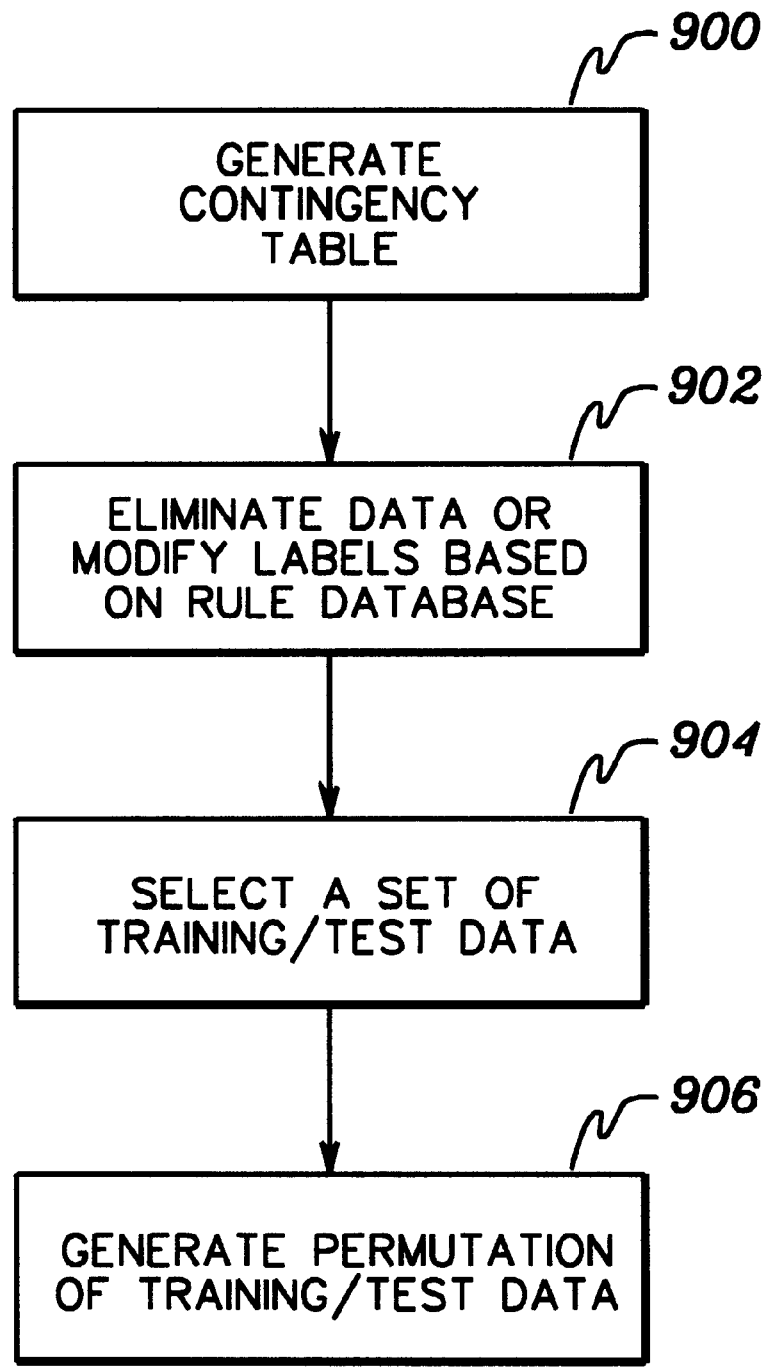
FIG. 9 depicts another example of the logic associated with reconstructing the training set of FIG. 8, in accordance with the principles of the present invention.

Reconstruction STEP 806 is described above with reference to FIG. 3, STEP 304. However, another example of reconstruction is described with reference to FIG. 9. Initially, a contingency table is generated, as described above, STEP 900. Thereafter, data from the training set is deleted or labels are modified based on a set of rules, STEP 902. Subsequently, a set of training data (and/or validation test data) is selected, STEP 904, for use as the new training set. The selected training data are then shuffled to ensure a mix of data, STEP 906.

One example of a supervised classification technique 808 (FIG. 8) is progressive classification. Progressive classification is a methodology for constructing robust classifiers that relies on the properties of transforms used for source coding. Any kind of existing classifier, both parametric (Maximum Likelihood, Bayesian) and non-parametric (Nearest Neighbor, Learning Vector Quantization, Neural Networks, CART, to mention just a few), can be implemented as a progressive classifier. One example of progressive classification is described in detail in "progressive Classification in the Compressed Domain for Large EOS Satellite Databases," by Castelli, Chung-Sheng, Turek and Kontoyiannis, Proceedings of ICASSP 1996, IEEE International Conference on Acoustics, Speech and Signal Processing, May 7–10, 1996, Vol. 4, p. 2199, which is hereby incorporated herein by reference in its entirety.

To illustrate the concept, a multiresolution pyramid that results from a Discrete Wavelet Transform (DWT) of image data is referenced, but the concept can be immediately generalized to any d-dimensional lattice data set. A multi-resolution pyramid is a set of coarser and coarser approximations to the original signal. Each approximation has double the scale and half the resolution of the previous one, thus requiring only ¼ of the samples of the immediately finer level.

Progressive classification analyzes first the coarsest approximation available, and determines if the sample corresponds to a homogeneous or to a heterogeneous square block in the original image. In the former case, it determines the label for the block and labels it. In the latter case, it recursively analyzes the coefficients corresponding to the block at the immediately finer approximation level. If the classes associated with the pixels have spatial coherence, for instance if they form a correlated 2-dimensional process, one can show that the progressive classifier is not only faster but also more accurate than the corresponding classifier that analyzes pixels independently. Also, one can determine the optimum starting level from the statistical properties of the label process and of the single classes. As described above, the progressive classification approaches can be used in conjunction with the present invention discussed herein, in which the training set is revised according to a contingency table.

Described in detail above is a technique for modifying an unreliable training set that combines both unsupervised and supervised training techniques. A data set is first clustered to provide a plurality of clusters, each with its own cluster label. Then, a set of rules is used to determine whether the original labels for the data in each cluster (or group) is correct. If any label is incorrect, then it may be changed, in accordance with the principles of the present invention.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

The flow diagrams depicted herein are just exemplary. There may be many variations to these diagrams or the steps (or operations) described therein without departing from the spirit of the invention. For instance, the steps may be performed in a different order, or steps may be added, deleted or modified. All of these variations are considered a part of the claimed invention.

Additionally, the rules provided for modifying the labels are only exemplary. Other rules can also be used without departing from the spirit of the present invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of modifying a training set for use in data classification, said method comprising:

determining at least one datum of said training set is incorrect;

reconstructing said at least one datum of said training set to provide a modified training set; and wherein said reconstructing comprises modifying a label associated with said at least one datum to provide a correct label.

2. A method of modifying a training set for use in data classification, said method comprising:

determining at least one datum of said training set is incorrect;

reconstructing said at least one datum of said training set to provide a modified training set;

wherein said training set comprises a plurality of data, each with a corresponding label, and wherein said determining comprises:

dividing said plurality of data into a plurality of groups; and applying one or more rules to at least a portion of the data of at least one group of said plurality of groups to determine if any of said corresponding labels of said at least a portion of the data is incorrect; and wherein said applying comprises applying one or more rules to the data of each group of said plurality of groups to determine if any corresponding labels is incorrect.

3. A method of modifying a training set for use in data classification, said method comprising:

determining at least one datum of said training set is incorrect;

reconstructing said at least one datum of the training set to provide a modified training set;

further comprising determining whether said modified training set is acceptable and repeating said determining and said reconstructing when said modified training set is unacceptable;

wherein said determining whether said modified training set is acceptable comprises;

creating a set of rules based on said modified training set;

using said set of rules to instantiate a classifier related to the modified training set;

comparing results of the instantiation with one or more predetermined conditions to determine if the modified training set is acceptable; and wherein said creating and using are based on a progressive classification technique.

4. A method of modifying a training set for use in data classification, said method comprising:

determining at least one datum of said training set is incorrect;

reconstructing said at least one datum of the training set to provide a modified training set;

further comprising determining whether said modified training set is acceptable and repeating said determining and said reconstructing when said modified training set is unacceptable;

wherein said determining whether said modified training set is acceptable comprises:

creating a set of rules based on said modified training set;

using said set of rules to instantiate a classifier related to the modified training set;

comparing results of the instantiation with one or more predetermined conditions to determine if the modified training set is acceptable; and wherein said creating and using are based on a genetic classification technique.

5. A method of modifying a training set for use in data classification, said training set comprising a plurality of data, each with a corresponding label, said method comprising:

determining at least one datum of said training set is incorrect, said determining comprising dividing said plurality of data into a plurality of groups and applying one or more rules to at least a portion of the data of at least one group of said plurality of groups to determine if any of said corresponding labels of said at least a portion of the data is incorrect; and p1 reconstruction said at least one datum of said training set to provide a modified training set, wherein said reconstructing comprises:

constructing a contingency table for the data of said plurality of groups;

creating a histogram from said contingency table;

identifying any regions of low confidence from said histogram; and modifying labels associated with data identified to be within a region of low confidence.

6. A method of modifying a training set for use in data classification, said training set comprising a plurality of n-dimensional feature vectors, each feature vector having an associated label, said method comprising:

determining at least one datum of said training set is incorrect, said at least one datum comprising at least one of a feature vector or its associated label; and reconstructing without discarding said at least one datum of said training set to provide a modified training set for use in data classification.

7. The method of claim 6, wherein said reconstructing is performed automatically.

8. The method of claim 6, wherein said training set comprises a plurality of data, each with a corresponding label, and wherein said determining comprises:

dividing said plurality of data into a plurality of groups; and applying one or more rules to at least a portion of the data of at least one group of said plurality of groups to determine if any of said corresponding labels of said at least a portion of the data is incorrect.

9. The method of claim 6, further comprising determining whether said modified training set is acceptable and repeating said determining and said reconstructing when said modified training set is unacceptable.

10. The method of claim 9, wherein said determining whether said modified training set is acceptable comprises:

creating a set of rules based on said modified training set;

using said set of rules to instantiate a classifier related to the modified training set; and comparing results of the instantiation with one or more predetermined conditions to determine if the modified training set is acceptable.

11. An article of manufacture comprising a computer useable medium having computer readable program code means embodied therein for causing the modification of a training set for use in data classification, the computer readable program code means in said article of manufacture comprising:

computer readable program code means for causing a computer to effect determining at least one datum of said training set is incorrect;

computer readable program code means for causing a computer to effect reconstructing said at least one datum of said training set to provide a modified training set; and wherein said computer readable program code means for causing a computer to effect reconstructing comprises computer readable program code means for causing a computer to effect modifying a label associated with said at least one datum to provide a correct label.

12. An article of manufacture comprising a computer useable medium having computer readable program code means embodied therein for causing the modification of a training set for use in data classification, said training set comprising a plurality of n-dimensional feature vectors, each feature vector having an associated label, the computer readable program code means in said article of manufacture comprising:

computer readable program code means for causing a computer to effect determining at least one datum of said training set is incorrect, said at least one datum comprising at least one of a feature vector or its associated label; and computer readable program code means for causing a computer to effect reconstructing without discarding said at least one datum of said training set to provide a modified training set for use in data classification.

13. The article of manufacture of claim 12, wherein said training set comprises a plurality of data, each with a corresponding label, and wherein said computer readable program code means for causing a computer to effect determining comprises:

computer readable program code means for causing a computer to effect dividing said plurality of data into a plurality of groups; and computer readable program code means for causing a computer to effect applying one or more rules to at least a portion of the data of at least one group of said plurality of groups to determine if any of said corresponding labels of said at least a portion of the data is incorrect.

14. The article of manufacture of claim 13, wherein said computer readable program code means for causing a computer to effect applying comprises computer readable program code means for causing a computer to effect applying one or more rules to the data of each group of said plurality of groups to determine if any corresponding labels is incorrect.

15. The article of manufacture of claim 13, an article of manufacture comprising a computer useable medium having computer readable program code means embodied therein for causing the modification of a training set for use in data classification, the computer readable program code means in said article of manufacture comprising:

computer readable program code means for causing a computer to effect determining at least one datum of said training set is incorrect;

computer readable program code means for causing a computer to effect reconstructing said at least one datum of said training set to provide a modified training set; and wherein said training set comprises a plurality of data, each with a corresponding label, and wherein said computer readable program code means for causing a computer to effect determining comprises:

computer readable program code means for causing a computer to effect dividing said plurality of data into a plurality of groups; and computer readable program code means for causing a computer to effect applying one or more rules to at least a portion of the data of at least one group of plurality of groups to determine if any of said corresponding labels of said at least a portion of data is incorrect; and wherein said computer readable program code means for causing a computer to effect reconstructing comprises:

computer readable program code means for causing a computer to effect constructing a contingency table for the data of said plurality of groups;

computer readable program code means for causing a computer to effect creating a histogram from said contingency table;

computer readable program code means for causing a computer to effect identifying any regions of low confidence from said histogram;

computer readable program code means for causing a computer to effect modifying labels associated with data identified to be within a region of low confidence.

16. The article of manufacture of claim 12, further comprising computer readable program code means for causing a computer to effect determining whether said modified training set is acceptable and repeating said determining and said reconstructing when said modified training set is unacceptable.

17. The article of manufacture of claim 16, wherein said computer readable program code means for causing a computer to effect determining whether said modified training set is acceptable comprises:

computer readable program code means for causing a computer to effect creating a set of rules based on said modified training set;

computer readable program code means for causing a computer to effect using said set of rules to instantiate a classifier related to the modified training set; and computer readable program code means for causing a computer to effect comparing results of the instantiation with one or more predetermined conditions to determine if the modified training set is acceptable.

18. A system of modifying a training set for use in data classification, said system comprising:

means for determining at least one datum of said training set is incorrect;

a reconstruction unit adapted to reconstruct said at least one datum of said training set to provide a modified training set;

wherein said reconstruction unit is further adapted to modify a label associated with said at least one datum to provide a correct label.

19. A system of modifying a training set for use in data classification, said system comprising:

means for determining at least one datum of said training set is incorrect;

a reconstruction unit adapted to reconstruct said at least one datum of said training set to provide a modified training set;

wherein said training set comprises a plurality of data, each with a corresponding label, and wherein said means for determining comprises:

means for dividing said plurality of data into a plurality of groups; and means for applying one or more rules to at least a portion of the data of at least of one group of said plurality of groups to determine if any of said corresponding labels of said at least a portion of the data is incorrect; and wherein said means for applying comprises means for applying one or more rules to the data of each group of said plurality of groups to determine if any corresponding labels is incorrect.

20. A system of modifying a training set for use in data classification, said system comprising:

means for determining at least one datum of said training set is incorrect;

a reconstruction unit adapted to reconstruct said at least one datum of said training set to provide a modified training set;

wherein said training set comprises a plurality of data, each with a corresponding label, and wherein said means for determining comprises:
  means for dividing said plurality of data into a plurality of groups; and
  means for applying one or more rules to at least a portion of the data of at least of one group of said plurality of groups to determine if any of said corresponding labels of said at least a portion of the data is incorrect; and
wherein said reconstruction unit comprises:
means for constructing a contingency table for the data of said plurality of groups;
means for creating a histogram from said contingency table;
means for identifying any regions of low confidence from said histogram; and
means for modifying labels associated with data identified to be within a region of low confidence.

21. A system of modifying a training set for use in data classification, said training set comprising a plurality of n-dimensional feature vectors, each feature vector having an associated label, said system comprising:
  means for determining at least one datum of said training set is incorrect, said at least one datum comprising at least one of a feature vector or its associated label; and
  a reconstruction unit adapted to reconstruct without discarding said at least one datum of said training set to provide a modified training set for use in data classification.

22. The system of claim 21, wherein said reconstruction unit is adapted to perform said reconstructing automatically.

23. The system of claim 21, wherein said training set comprises a plurality of data, each with a corresponding label, and wherein said means for determining comprises:
  means for dividing said plurality of data into a plurality of groups; and
  means for applying one or more rules to at least a portion of the data of at least one group of said plurality of groups to determine if any of said corresponding labels of said at least a portion of the data is incorrect.

24. The system of claim 21, further comprising means for determining whether said modified training set is acceptable and means for repeating said determining and said reconstructing when said modified training set is unacceptable.

25. The system of claim 24, wherein said means for determining whether said modified training set is acceptable comprises:
  means for creating a set of rules based on said modified training set;
  means for using said set of rules to instantiate a classifier related to the modified training set; and
  means for comparing results of the instantiation with one or more predetermined conditions to determine if the modified training set is acceptable.

* * * * *

UNITED STATES PATENT AND TRADEMARK OFFICE
CERTIFICATE OF CORRECTION

PATENT NO. : 6,298,351 B1
DATED : October 2, 2001
INVENTOR(S) : Castelli et al.

It is certified that error appears in the above-identified patent and that said Letters Patent is hereby corrected as shown below:

<u>Column 9,</u>
Line 64, delete "p1"
Line 64, delete the word "reconstruction" and insert -- reconstructing -- also with the word reconstructing, start a new paragraph Signed and Sealed this Ninth Day of April, 2002

*Attest:*

*Attesting Officer*

JAMES E. ROGAN
*Director of the United States Patent and Trademark Office*